April 27, 1943.   I. C. BELL   2,317,433
PISTON
Filed Aug. 22, 1941   2 Sheets-Sheet 1
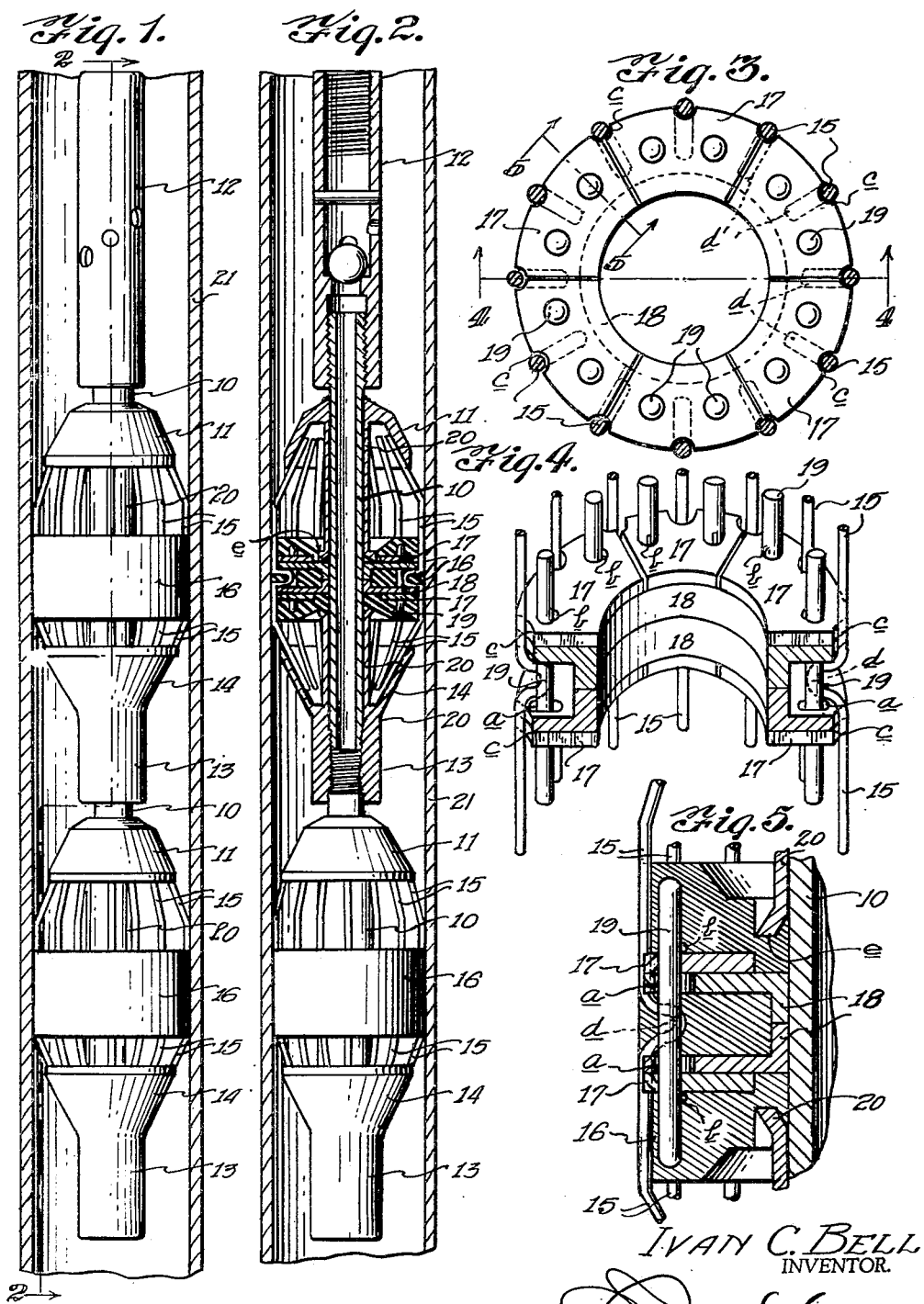
IVAN C. BELL
INVENTOR.
BY
ATTORNEY April 27, 1943.　　　I. C. BELL　　　2,317,433
PISTON
Filed Aug. 22, 1941　　　2 Sheets-Sheet 2
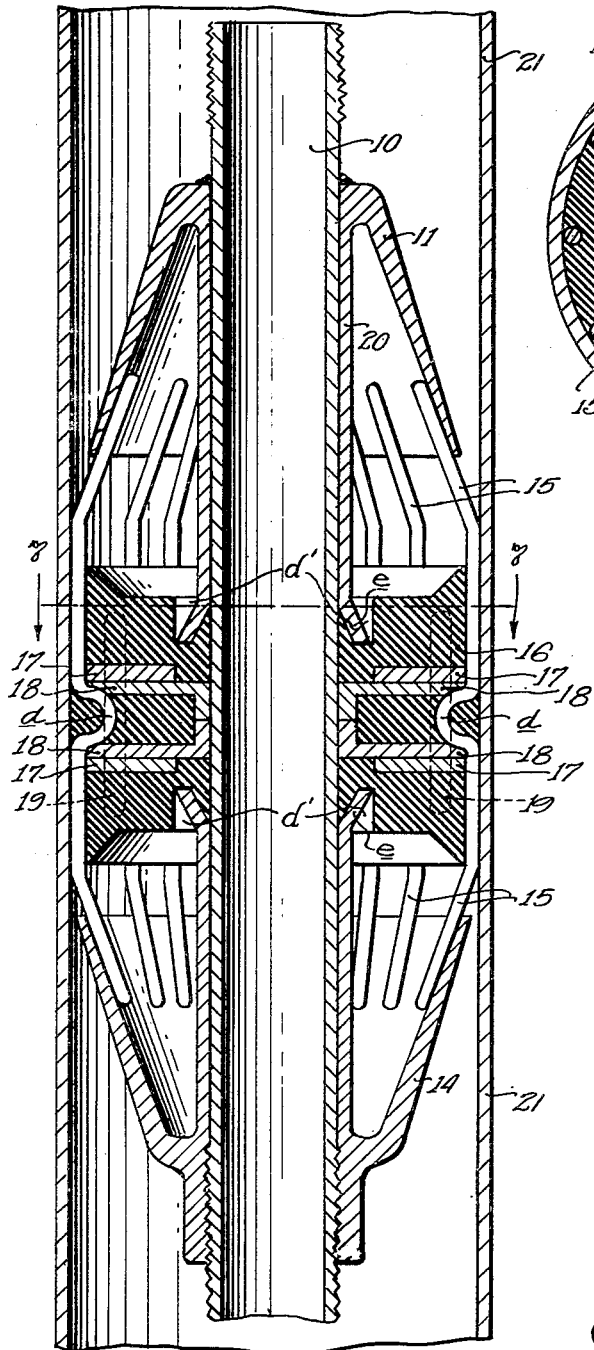
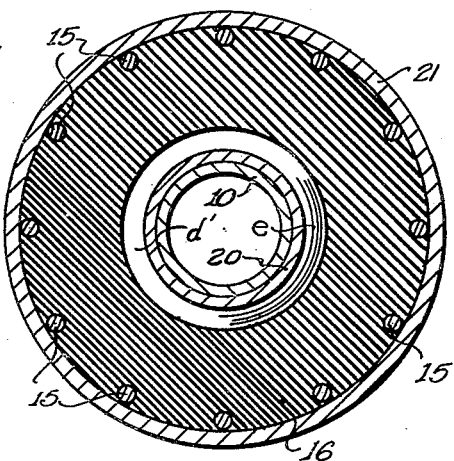
IVAN C. BELL
INVENTOR.
BY
ATTORNEY Patented Apr. 27, 1943

2,317,433

UNITED STATES PATENT OFFICE 2,317,433

PISTON

Ivan C. Bell, Dallas, Tex.

Application August 22, 1941, Serial No. 407,933

10 Claims. (Cl. 309—4)

This invention relates to well swabs and it is particularly concerned with certain new and useful improvements in swab bodies.

The principal object of the invention is to provide a swab body or cup of a suitable resilient compound having an articulated reinforcing structure wholly embedded therein, yet allowing for controlled relative movements of the elements of the structure as required by manipulations of the swab body and the pressures imposed thereon.

Another and equally important object of the invention is to provide an articulated reinforcement for swab bodies which, by virtue of the relative but controlled movement between the parts thereof, uniform circumferential or radial expansion and contraction of the resilient body is made possible which is a definite insurance against undue wear and consequent weakening of the body, usually occurring on the upper portion thereof.

Still another object of the invention is to provide a packer reinforcement whose structural characteristics are such that the composition of the packing element is allowed to flow or compress under a load but restricts outward movement thereof, thereby prolonging the life of the packing element by minimizing the likelihood of tearing of the composition since the latter is maintained under compression. Moreover, the invention affords a retention for the packing element which allows for a link motion thereof, producing a wobble which, together with provisions for taking up the wear on the packing element by further compressing the same, makes for a more effective and longer wearing seal.

Yet another object of the invention resides in the provision of a double ended packing element which, in addition to its invertibility, is highly efficient as a repulsion swab in agitating a well.

Another object of the invention is to provide a body reinforcing structure, through the medium of which equal distribution of frictional contact between the body and casing or tubing is effected whereby the wear imposed on the body will not be concentrated at any particular point, thus enabling the body to be inverted on the mandrel for continued use.

Still another object of the invention is to provide a body reinforcing structure whose assembly is such that it will yield to radial expansions required of the body under working loads and pressures without placing any part of the structure under stress or strain, yet will prevent rupture, distention or other irregularities of contour of the body which would shorten the life of the latter and materially reduce the efficiency of the swab as a whole.

With the foregoing objects as paramount, the invention has particular reference to certain features of accomplishment which will become manifest as the description proceeds, taken in connection with the accompanying drawings wherein:

Figure 1 is an elevation of a well swab constructed according to the present invention disposed in a casing shown in vertical cross-section.

Figure 2 is a view similar to Figure 1 but showing one of the swab units in vertical section.

Figure 3 is a plan view of the articulated body reinforcing structure of the invention.

Figure 4 is a transverse section of the reinforcing structure, shown in perspective and taken on line 4—4 on Figure 3.

Figure 5 is a fragmentary detail view of one of the swab units showing in vertical section on line 5—5 on Figure 3 the particular relationship of parts.

Figure 6 is an enlarged sectional view of the swab body expanded and

Figure 7 is a transverse section on line 7—7 on Figure 6, and

Figure 8 is a detail view of one of the wires of the cage.

Continuing with a more detailed description of the drawings, reference numeral 10 denotes a tubular mandrel on which there is provided an inverted thimble 11. The mandrel 10 is threaded at its upper end to be received by a valve 12. The lower end of the mandrel 10 is likewise threaded and on which is mounted a sleeve 13, carrying a thimble 14 confronting its companion thimble 11. Thus, there is provided, through the arrangement of thimbles, a retainer for the cage composed of rods or wires 15 arranged radially about and partially embedded in the packing members 16 as shown in the drawings, and whose upper and lower ends are received in the thimbles 11 and 14 respectively in the manner shown.

The present invention is comprised of packing member 16 and its associated parts which include the reinforcing structure shown in detail in Figures 3 to 7. The reinforcing structure consists of a plurality of metallic segments 17 which cooperatively form a ring as shown in Figure 3. Two of such rings are provided which are loosely and conformably mounted on either face of a complementary ring made up of two annular flanged members 18.

The assembly described is joined together in a loose combination by radially disposed and relatively spaced pins 19 passing through conforming apertures near either end of each segment 17, thence through slots a in the flange of each member 18, and through conforming apertures similarly disposed in the segments on the opposite face of the flanged members 18. The pins 19 are held in position by protuberances b made thereon as by pinching or other method, and located flush with the segments 17 on either side of the assembly.

At equidistantly spaced intervals about the periphery of the assembly described, there is provided a series of recesses c, formed to receive the wires 15, as shown. These wires are each kinked or bent into U-shape at d intermediate their ends and when in assembled relationship with the reinforcing structure described, the bends or kinks d extend radially into the annular recess defined by the opposed flanges of the members 18 and serve as anchors to prevent relative longitudinal movement between the wires and packers and to maintain proper spacing of the latter between the thimbles 11 and 14. It is important to note that in so anchoring the wires, the packer 16 is allowed to wobble on a plane through its middle which makes for self-adjustment in the tubing.

From the foregoing it will be seen that the composite reinforcing structure is unique in the matter of its flexibility. All of the associated parts are capable of prescribed limited movement, one with another to follow, yet control the "breathing" action of the packing under stress.

The resilient compound of the packing element 16 while in a plastic state, is molded under pressure upon the reinforcing structure so that all interstices therein will be completely filled, leaving no voids likely to weaken the body thus formed. The wires 15 are in position when this operation takes place, therefore when the compound sets, the assembly becomes an integral body with no part of the reinforcing exposed, except for the extended ends of wires 15 forming the cage, these are likewise embedded in the packing element 16 with the anchor bends d completely surrounded with the compound of the packing element. Spaced inwardly from the central opening of each packing element 16 and on either end thereof, there is provided an annular recess d'.

In assembling the swab units, sleeves 20 (Figs. 2 and 6) are concentrically disposed on the mandrel 10, the ends of which are flared at e and bear opposite ends of the packing 16 in recesses d' provided therefor. As the swab unit is moved into assembled position, the ends of the wires 15 are received in their respective thimbles 11 and 14. Any desired number of swab units may be connected together in a string in the usual manner and as shown.

It will be understood that the length of the lower sleeve 20 is such in relation to the angle and length of the thimble 14 that when the tool is initially adjusted preparatory to introduction into the casing or tubing, there will be a tendency on the part of the thimble 14 to draw the lower ends of wires 15 collectively inward, as against a tendency on the part of the lower sleeve 20 to slightly compress that portion of the packing between its flared end e and the central opening in the packing, to insure a tight seal between the packing and mandrel.

It is of particular importance to note that the upper end of the packer, in being of identical construction to the lower end, to include also the annular recess d', and further, that adjustments may provide for spacing between the upper ends of wires 15 and the inner wall of the thimble 11, fluid pressure, when the tool is in operation will enter the recess d', causing compression and consequently an outward expansion of the upper portion of the packer, so limited by virtue of the rings 18 whose diameters are fixed, but permitted by virtue of the radially displaceable segments 17. As the upper portion of the packer expands, the wires 15 pivot at d, their lower ends contracting relatively while the upper ends radially expand. It is obvious that when this action occurs, the movement of the upper segments 17 is outward while displacement of the lower segments is inward. It is apparent, therefore, that the effective or upper part of the packer is the only portion thereof subject to frictional engagement with the walls of the tubing until the swab is reversed.

In operation, the swab units, assembled on the mandrel are lowered into the casing or tubing 21 in any suitable manner. The normal condition of the packing element 16 is as shown in Figures 1 and 2, that is, their outer diameters are substantially equal to the inner diameter of the walls of the casing 21.

As the swab starts to ascend, the pressure of well fluid entering the annular space inside the cage, about the mandrel and above the packing element 16 will force the upper portion thereof outwardly into frictional engagement with the walls of casing 21. When this occurs, the pressure thus imposed thrusts downwardly on packing element 16, compressing the sealing element against the flanged ends of sleeves 20, causing expansion of articulated reinforcing, thereby insuring a more positive seal at the upper end of the packing element than would be provided by conventional packers which make no provision for the expansion of the packing element reinforcing in direct proportion to the expansion of the packing element itself which makes for concentrated and speedy wear on the packing element at the top where the pressure is greatest and likewise promotes rupture of the packer by distention and finally the cutting of the reinforcement through the resilient composition of the packing element to render the latter useless. Not only does the present invention remove these objectionable features to prolong the usefulness of the packing element but such usefulness is further extended by reason of the fact that should wear occur at the top of the packing element of the invention, the peculiar construction thereof permits inversion of the same for continued use with equally as effective results as if the packing element were in its original unused condition.

It being well known that rubber or like composition when under compression is less subject to wear than when elongated, the pins 19 of the reinforcing bushing allow the rubber to flow or compress although they restrict outward movement. The packing element, in being, as it is, subjected to excessive abrasive action in the well casing must withstand considerable abuse and yet perform the function of providing an effective seal, hence the provision herein for controlled compression.

Since the pins 19 do not restrict compression of the packing element against wearing off in use, and becoming too small to provide an effective seal, adjustment to effect mechanical compression of the packer is accomplished by tightening the lower sleeve on bell nut 13, which action will increase the tension on the upper sleeve on bell nut by compressing the packing element between the flared sleeves. Under present economical conditions, this feature affords a saving inasmuch as it insures longer life to the packing element.

It is often necessary to agitate the well by running a repulsion swab therein and reciprocating the same. It is apparent that in the construction of the present swab, providing a double ended packing element, not only is it possible to invert the same when worn but it also serves very effectively as an agitator or repulsion swab. Moreover, the construction described as an improvement in swabs may also be used very effectively in the capacity of a well pump.

It will also be observed that the bend at *d* in the wires 15, while serving as an anchor for the same, another advantage arises in that the packing element is not only allowed to wobble by virtue of this anchorage and is thereby self conforming but also the wear thereon in passing joints and minor obstructions in the casing or tubing is minimized.

Manifestly, the construction shown and described is capable of considerable modification and such modification as may be considered to fall within the scope and meaning of the appended claims is also considered to be within the spirit and intent of the invention.

What is claimed is:

1. A well swab including a mandrel, a pair of opposed thimbles on said mandrel, an invertible packing element of resilient material having reinforcing wires embedded in the periphery thereof whose extended exposed ends are receivable in said thimbles, one of which latter is adjustable longitudinally on said mandrel, and an articulated reinforcing means having interconnected parts likewise embedded in said packing element, each being responsive to but limiting the radial movements of said packer, whereby to effect, through said reinforcing wires, the creation simultaneously of a major and a minor axis at opposite ends of said packing element.

2. A well swab, a tubular mandrel therefor, a resilient packing element having identical recesses in either end thereof and a passage through its center, a reinforcing means for said packing element comprising unconnected but juxtapositioned ring-like elements embedded in said packing element in concentric relation to said passage, a series of conforming segments forming a ring and loosely mounted on either side of said elements for limited independent radial displacement whereby to move in response to radial movements of said packing element, a wire reinforcement comprising a series of wires surrounding said packing element pivotally related to said reinforcing means and whose ends extend beyond the ends of said packing element, bell-shaped members on said mandrel, one of which is adjustable relative to one end of said wire reinforcement whereby to effect, through said wire reinforcement and said wire reinforcing means major and minor axis at opposite ends of said packing element.

3. A well swab including, a mandrel, thimbles in spaced apart relationship on said mandrel, one of which is adjustable longitudinally on said mandrel, a centrally apertured resilient packer unit embracing said mandrel having wires radially disposed therearound and embedded in the elastic material of said packing unit and whose exposed ends are receivable in said thimbles and a reinforcing means also embedded in said packing unit, surrounding its aperture and comprised of articulated structure whose elements are responsive to radial movements of said packing unit, said wires each having separate pivotal relation intermediate its ends to said reinforcing means to effect therethrough a constriction of one end of said packer unit simultaneously with expansion of its opposite end when said unit is under pressure.

4. A reinforcing bushing for swab packing element including a series of relatively positioned segments forming rings, pins connecting said segments for limited and independent radial displacement, said bushing being embedded in the resilient material of a packing element whereby said pins will not prevent but will control compression of said resilient material, means complementary to said reinforcing bushing to further reinforce said swab packing element, said means comprising radially arranged wires disposed in longitudinal relationship with said packing element and in pivotal relation with said bushing intermediate their ends whereby, thimbles embracing the ends of said wires, one of which thimbles is adjustable relative to the end of said complementary reinforcing means whereby to effect through the joint action of said bushing and complementary reinforcing means a major and a minor axis at opposite ends of said packing element.

5. A swab packer and bushing therefor, a resilient, centrally perforated body having analogously shaped ends for invertibility, said bushing comprising juxtapositioned ring-like and flanged elements embedded in said body in concentric relation to the perforation therein, segments mounted on either side of said ring-like elements, pins arranged radially about said perforation, parallel with its axis and retaining said segments for limited relative and radial displacement, said pins being arranged to control the expansion but not the compression of said body, and radially arranged wires partially embedded in said body and anchored at an intermediate point to a point intermediate the ends of said body to retain the same for slight wobbling motion, whereby to effect, with said bushing, a constrictive action on one end of said body simultaneously with the expansive action on the opposite end thereof under load.

6. As an article of manufacture, a swab packing comprising an articulated reinforcing means, one part of which is of fixed diameter and another part of variable diameter with still another part pivotally related to the first named parts and extending beyond the packing which embraces a part of the reinforcing means and secures them in working relation with each other and with the packing.

7. A swab comprising a support, a pair of thimbles embracing articulated reinforcing means, one part of which secures a portion of the packing member of said swab in sealing relation with the support and another part permitting another portion of the sealing means to expand outwardly in sealing relation with a well casing.

8. A swab comprising a support, a pair of thimbles embracing articulated reinforcing means, one part of which secures a portion of the packing member of said swab in sealing relation with the support and another part permitting another portion of the sealing means to expand outwardly in sealing relation with a well casing, complementary reinforcing means partially embedded in and extending beyond the packing member longitudinally and secured in pivotal relation with the articulated reinforcing means, said complementary reinforcing means adapted to be secured by the thimbles, one of which thimbles is adjustable on the support whereby to effect through said complementary reinforcing means the creation simultaneously of a minor and a major axis at opposite ends of the sealing means.

9. A packing assembly for well pistons comprising a reinforcing member of fixed diameter, another of variable diameter and a third pivotally related to the first two members and a sealing element surrounding and securing in working relation.

10. A structure as set forth in claim 9 in which the third member of the assembly is comprised of coaxial and radially arranged wires whose ends extend beyond the ends of the sealing member and which move radially apart in direct relation to the degree of expansion of said sealing member when subjected to axial pressure.

IVAN C. BELL.